Nov. 9, 1937.  W. E. SMITH ET AL  2,098,636
FISH AND TACKLE BASKET
Filed July 24, 1936   2 Sheets-Sheet 1

Inventor
W. E. Smith,
I. J. Focht,
By Eugene Stevens
His Attorney

Nov. 9, 1937.  W. E. SMITH ET AL  2,098,636
FISH AND TACKLE BASKET
Filed July 24, 1936   2 Sheets-Sheet 2
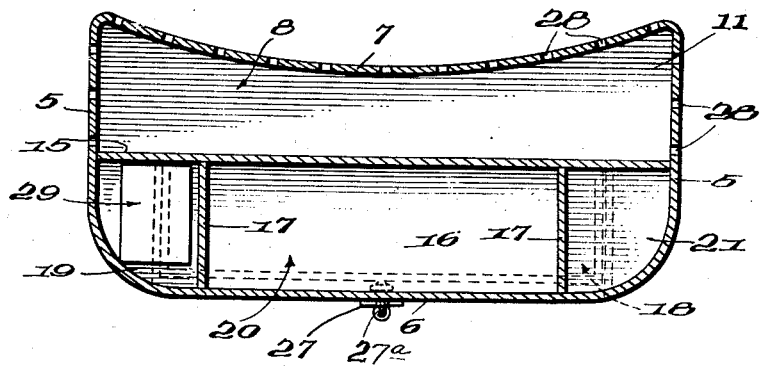
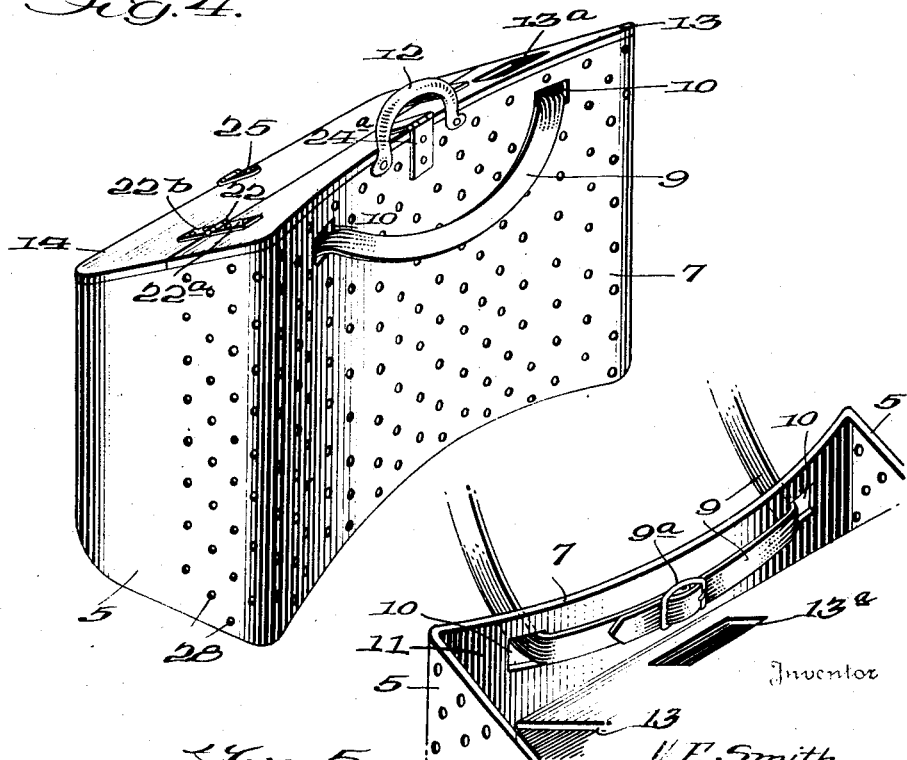

Patented Nov. 9, 1937

2,098,636

UNITED STATES PATENT OFFICE 2,098,636

FISH AND TACKLE BASKET

William E. Smith and Irvine J. Focht, Wellsboro, Pa.

Application July 24, 1936, Serial No. 92,460

7 Claims. (Cl. 43—31)

Our invention relates to improvements in combined fish and tackle containers for fishermen.

Briefly stated, the invention has for its primary object to provide a device for this purpose which not only eliminates the necessity for carrying a creel and separate tackle box, but also provides a bait carrying compartment,—the nature and arrangement of the various parts making for the provision of a very compact and convenient arrangement of storage areas for tackle elements of different size, entirely separate and apart from the storage space for the fish caught, and which furthermore provides means whereby different ones of said tackle storage compartments will be independently accessible.

More specifically it is an object of the invention to provide a device for the purpose stated which may be made of either stiff or flexible waterproofed fibrous material and incorporates partitioning means which when secured in place provides a front tackle compartment and a rear fish compartment, the latter having its back wall shaped to more or less conform to the curve of the user's body when hung against his side from the shoulder; and which partitioning means maintains at least the front tackle storage part of the device in predetermined shape, besides dividing the same into a plurality of tackle-receiving spaces.

Additionally the invention aims to furnish a device for the purpose stated which not only includes a plurality of individual tackle receiving spaces separate and apart from a fish storage space, but which also incorporates a drawer and space therefor which latter is provided by a partitioning means which maintains the tackle-receiving portion of the device in predetermined form,—there being provided means whereby the drawer and other tackle-receiving spaces are separately and independently accessible.

Furthermore, the invention contemplates the provision of a main partition separating fish and tackle compartments, and which partition carries hinge means common to the closures of both the fish and tackle compartments whereby duplication of hinges for the latter is unnecessary.

Various other objects and advantages of the invention will become apparent to those skilled in the art from a reading of the detailed description of the now preferred example thereof which is illustrated in the accompanying drawings, the invention residing in certain novel features of construction, combination and arrangement of the various parts as hereinafter claimed.

It is to be understood, however, that the particular example of the invention shown in the accompanying drawings is not to be taken as limitative beyond the spirit and scope of the invention as claimed, as it is obvious that various changes may be made in the structure shown, without departure from what is claimed as new and patentable.

In the drawings wherein the same reference characters have been used to designate the same parts throughout the several views,—

Figure 3 is a horizontal sectional view;

Figure 4 is a perspective view showing the rear of the device with the looped carrying strap pulled into the fish compartment out of the way, and Figure 5 is a fragmentary perspective view looking into the fish compartment with the closure open.

Figure 1:
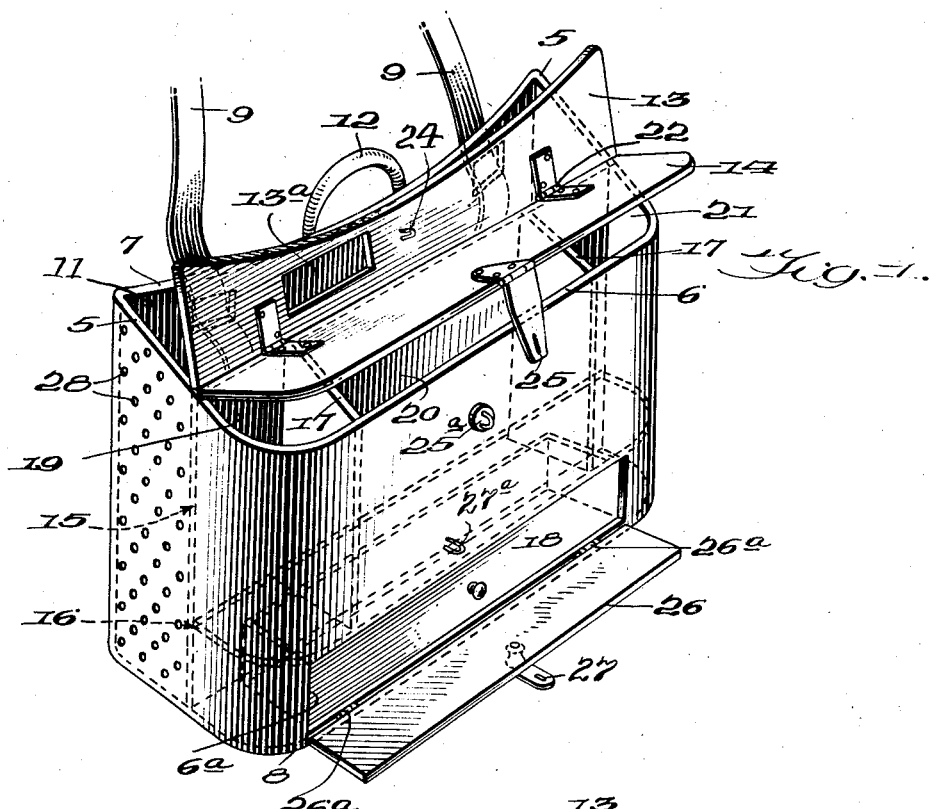
Figure 1 is a perspective view illustrating a combined fish and tackle container embodying our invention.
Figure 2:
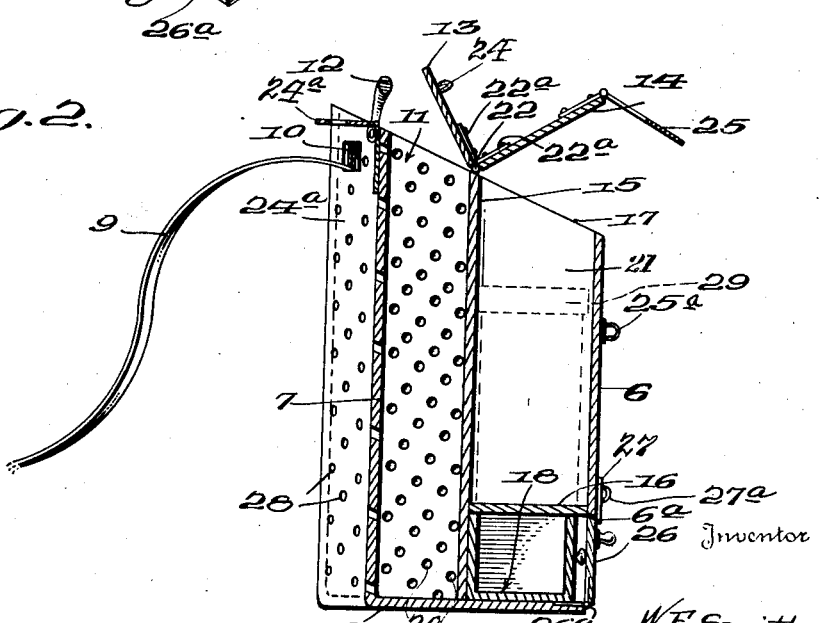
Figure 2 is a central vertical cross sectional view but showing fasteners 25, 27 in edge elevation and illustrating the bait box in dotted lines.

Referring specifically to the drawings, the container which is open at the top, is seen to comprise the end walls 5, front wall 6, rear wall 7 and the bottom wall 8. The rear wall 7 and the rear edge of the bottom wall 8, as shown in Figure 3, are given a concaved form so as to more or less conform to the curve of the side of the body of the user when the device is slung from the latter's shoulder by the strap 9 which is passed through the holes 10 in the rear wall 7 as shown in Figures 2, 4 and 5.

The body of the device may be made of different materials whether relatively stiff or flexible. It is, of course, desirable that the material be not only durable so as to withstand rough usage, but also that it be waterproof. A rubber-vulcanized fibrous material such as canvas may be used to advantage as same is relatively light and being flexible enables a rear fish-receiving compartment 11 to be provided which will lie snugly and comfortably against the body of the user. However, stiffer or more rigid material such as a molded fibre and rubber composition may be used for the container body or for different portions thereof.

In carrying out the now preferred form of the invention as shown in the drawings, the upper ends of the end walls 5 are cut on a bias and slope downwardly toward the upper end of the front wall 6. This is desirable in that it leaves the rear wall 7 to define the highest point of the container for the attachment of the carrying handle 12 which is located intermediate the strap-receiving holes 10. Inasmuch as the container is of considerable width it would be somewhat inconvenient to carry the device if the handle 12 were midway between the front and rear walls 6, 7; and also such intermediate part of the container is open and adapted to be closed by closures 13, 14 to be more definitely referred to later on herein.

Handle 12 would be used when going to and from the fishing region, at which times the user might not be wearing his fishing clothes and would not want a wet or fishy smelling container hanging over his shoulder. At such times, the strap 9 can be simply pulled into the fish compartment without unfastening the buckle 9a.

The fish compartment 11 at the rear of the container and a tackle storage area at the front thereof are provided by a vertical partition 15 which is secured to the end and bottom walls 5, 8, respectively, at a point between the front wall 6 and rear wall 7 and substantially parallel with said front wall 6.

The tackle storage area is divided into a plurality of compartments by the horizontal partition 16 and the two laterally spaced superjacent vertical partitions 17 which extend into the tackle storage area from vertical partition 15. Horizontal partition 16 is spaced parallel above the bottom 8 opposite an opening 6a in the front wall to thereby accommodate a drawer 18 which is insertable through said front wall opening 6a. Said last mentioned partitions 16, 17 are preferably secured to said vertical partition 15 and to the front wall 6; and the vertical partitions 17 will also preferably be secured to the top surface of the horizontal partition 16. This provides, not only three open-at-the-top tackle compartments 19, 20, 21 (which may be of different sizes) above the horizontal partition 16, but also provides a relatively rigid partition structure assembly embodying the first-mentioned main vertical partition 15 and partitions 17 for holding the tackle area of the container and its compartments in definite predetermined form even though the container be made of flexible material. Obviously said partition assembly lends strength to the device regardless of the particular material from which it is formed. Such partition structure would leave the fish compartment 11 more or less collapsible if the container is made of flexible material so as to substantially cushion against the user's body whether it contains fish or not. The partition struction therefore has a substantial two-fold advantage whether the container material is flexible or not; and when the container material is flexible the cushion-like fish compartment for disposition against the user's body is a third advantage.

Still referring to the partition structure and especially to the first mentioned main vertical partition 15, it will be noted that it carries the pintle portions of leaf hinges or the equivalent 22; and that the hinge leaves 22a at one side carry the closure 13 of the fish compartment, while the leaves 22b at the other side carry the top closure 14 of the tackle area which has been divided into the compartments 19, 20, 21 by the vertical partitions 17. Cooperating fasteners 24, 24a carried by the fish compartment closure 13 and the rear wall of the container serve to secure the former in place, and it is to be noted that there is a fish insertion opening 13a in the closure 13 so that fish can be inserted without opening closure 13. Cooperating fasteners 25, 25a secured to the tackle area closure member 14 and front wall of the container serve to hold such closure 14 closed.

A closure 26 hinged as at 26a to the fore portion of the bottom 8 of the container is arranged to swing up to close the drawer opening 6a in the front wall 6 so as to hold the drawer 18 in place; and such closure has cooperating fastening elements 27, 27a secured thereto and to the front wall 6.

As shown in the drawings, certain of the walls of the fish compartment 11 may be perforated as at 28 so as to provide ventilation.

Especial attention is also invited to the fact that hinges 22 of closures 13 and 14 are carried by the vertical longitudinally extending partition 15 immediately adjacent the forwardly extending partitions 17, at which point such partition 15 is reinforced or sustained by partitions 17. That partitions 17 do reinforce and sustain partition 15 is obvious because they are connected to the same and to horizontal partition 16 and also engage the front wall 6 of the container. Such reinforcement of partition 15 enables it to be made of comparatively light gauge material.

One of the smaller of the three one-at-the-top tackle compartments 19, 20, 21, such as compartment 21, is used for a bait receptacle 29. The larger mid-compartment 20 is available for relatively large tackle elements and the other smaller compartment 19 for smaller paraphernalia.

The drawer 18 may be suitably compartmented and used for hooks, flies, leaders, leads and the like and can, of course, be fully withdrawn if desired.

Regarding the looped carrying strap 9, it is to be noted that it can be readily gotten out of the way when not in use. Since the rear wall strap passage holes 10 are near the top of the rear wall 7, the looped strap 9 can be simply pulled inwardly without unfastening buckle 9a so that the major portion of the loop will sag down toward the bottom of the fish compartment 11 and by its weight maintain the exterior portion of the loop against the rear wall 7, as indicated in Fig. 4.

Additionally it is to be observed that when the drawer opening closure 26 is swung outwardly it forms a continuation of the container bottom 8 to support the drawer 18 in partially pulled out position.

Having thus described our invention, what we claim as new is:

1. A combined fish and tackle container for fishermen comprising in combination, a body having front, rear, side and bottom walls, and open at the top, a longitudinally extending vertical partition connecting said side and bottom walls between the front and rear walls whereby to provide a rear fish compartment extending the full height and length of the container and open at the top, said partition also providing a front tackle-receiving area in said container, means providing laterally spaced vertical partitions engaging said first-mentioned partition and abutting the front wall of the container whereby to reinforce the same and said first-mentioned partition and provide tackle-receiving compartments, separate swingable closures for said tackle and fish compartment portions of said container, and a common hinge means for said closures carried by said first-mentioned partition adjacent the second-mentioned partitions, the latter serving to reinforce the first-mentioned partition at the site of said hinge means, 2. A combined fish and tackle container for fishermen comprising in combination, a body having front, rear, side and bottom walls, and open at the top, a longitudinally extending vertical partition connecting said side and bottom walls between the front and rear walls whereby to provide a rear fish compartment extending the full height and length of the container and open at the top, said partition providing a front tackle-receiving area in said container, a horizontal partition carried by the aforementioned vertical partition and by the side and front walls of the container substantially parallel with the casing bottom and spaced therefrom whereby to provide subjacent drawer-receiving space, the front wall of said container having an opening registering with said space, a drawer insertible through said opening into said space, a closure hinged to the bottom of said container at the front edge thereof and movable to close said opening, said closure being adapted to be opened out to provide an extension of the casing bottom to support the drawer when partially pulled out of its space, fastening means for said front opening closure, separate closures for said fish and tackle compartment, and a common hinge means for said closures carried by said vertical partition.

3. A combined fish and tackle container for fishermen comprising in combination, a body having front, rear, side and bottom walls, and open at the top, a longitudinally extending vertical partition connecting said side and bottom walls between the front and rear walls whereby to provide a rear fish compartment extending the full height and length of the container and open at the top, said partition also providing a front tackle-receiving area in said container, means providing laterally spaced vertical partitions engaging said first-mentioned partition and abutting the front wall of the container whereby to reinforce the same and said first-mentioned partition and provide tackle-receiving compartments, separate swingable closures for said tackle and fish compartment portions of said container, a common hinge means for said closures carried by said first-mentioned partition adjacent the second-mentioned partitions, the latter serving to reinforce the first-mentioned partition at the site of said hinge means, and a looped carrying strap for said container, the rear wall of said container having laterally spaced holes adjacent the top through which said strap is adapted to be passed, whereby said strap is adapted to be pulled inwardly into said fish compartment without opening the loop and to sag down toward the bottom of the fish compartment when not in use.

4. A combined fish and tackle container for fishermen comprising in combination, a body having front, rear, side and bottom wall members, and open at the top, a longitudinally extending vertical partition connecting said side and bottom walls between the front and rear walls whereby to provide a rear fish compartment extending the full height and length of the container and open at the top, said partition providing a front tackle-receiving area in said container, a horizontal partition carried by the aforementioned vertical partition and by the side and front walls of the container substantially parallel with the casing bottom and spaced therefrom whereby to provide a subjacent drawer-receiving space, the front wall of said container having an opening opposite said drawer-receiving space, a drawer insertible through said opening into said space, a closure hinged to the container bottom at the front edge thereof and movable to close said opening whereby to hold said drawer in place, fastening means for said front opening closure, means providing laterally spaced vertical partitions extending between the first mentioned vertical partition and the front wall of the container above said horizontal partition providing means being adapted to be secured to either the front wall or the first-mentioned vertical partition and adapted to engage the other whereby to sustain the latter in position and provide at least three open-at-the-top compartments for bait and tackle above said horizontal partition, oppositely swingable closures for said fish compartment and for said open-at-the-top compartments, leaf hinges common to both closures carried by said first-mentioned partition adjacent each of said second-mentioned vertical partitions whereby to operatively secure said closures thereto, securing means for said closures, and a fish insertion opening in said fish compartment closure.

5. A combined fish and tackle container for fishermen comprising in combination, a body having front, rear, side and bottom walls, and open at the top, the rear wall and rear edge of the bottom wall being concave to at least partially conform to the curve of the body of the user when suspended from his shoulder, a looped carrying strap for said container, said rear wall having laterally spaced holes adjacent its top for the passage of said strap whereby the container can be slung from the user's shoulder, a carrying handle secured to said rear wall adjacent the top thereof and approximately midway between its ends, and between said strap-receiving holes, a longitudinally extending vertical partition connecting said side and bottom walls between the front and rear walls whereby to provide a rear fish compartment extending the full height and length of the container and open at the top, at least certain ones of the side and rear walls of said fish compartment part of the container being apertured for ventilation purposes, said partition providing a front tackle-receiving area in said container, a horizontal partition carried by the aforementioned vertical partition and by the side and front walls of the container parallel with the casing bottom and spaced therefrom whereby to provide a subjacent drawer-receiving space, the front wall of said container having an opening opposite said drawer-receiving space, a drawer insertible through said opening into said space, a closure hinged to the container bottom at the front edge thereof and movable to close said opening whereby to hold said drawer in place, fastening means for said front opening closure, laterally spaced vertical partitions extending between the first-mentioned vertical partition and the front wall of the container above said horizontal partition and secured to the latter and to the front wall and first-mentioned vertical partition whereby to sustain the latter in position and provide at least three open-at-the-top compartments for bait and tackle above said horizontal partition, oppositely swingable closures for said fish compartment and for said open-at-the-top compartments, leaf hinges common to both closures carried by said first-mentioned partition adjacent each of said second-mentioned vertical partitions whereby to operatively secure said closures thereto, securing means for said closures, and a fish insertion opening in said fish compartment.

6. A combined fish and tackle container for fishermen comprising in combination a body having front, rear, side and bottom walls, and open at the top, a longitudinally extending vertical partition connecting said side and bottom walls between the front and rear walls whereby to provide a rear fish compartment extending the full height and length of the container and open at the top, said partition providing a front tackle-receiving area in said container, a horizontal partition carried by the aforementioned vertical partition and by the side and front walls of the container substantially parallel with the casing bottom and spaced therefrom whereby to provide subjacent drawer-receiving space, the front wall of said container having an opening registering with said space, a drawer insertible through said opening into said space, separate closures for said fish and tackle compartment, and a common hinge means for said closures carried by said vertical partition.

7. A combined fish and tackle container for fishermen comprising in combination, a body having front, rear, side and bottom walls, and open at the top, the rear wall and rear edge of the bottom wall being concave to at least partially conform to the curve of the body of the user when suspended from his shoulder, partition means dividing said container into a rear fish compartment and a front tackle compartment, a looped carrying strap for said container, said rear wall having laterally spaced holes adjacent its top for the passage of said strap whereby the container can be swung from the user's shoulder, the major portion of said strap being adapted to be pulled into the fish compartment and held therein by its own weight when not in use and without unfastening same, and a carrying handle secured to said rear wall intermediate said top holes.

WILLIAM E. SMITH.
IRVINE J. FOCHT.